United States Patent
Heater

(10) Patent No.: US 8,063,124 B2
(45) Date of Patent: Nov. 22, 2011

(54) PHOSPHITE STABILIZERS FOR IONOMERIC POLYESTER COMPOUNDS

(75) Inventor: Paul L. Heater, Navarre, OH (US)

(73) Assignee: M&G USA Corporation, Apple Grove, WV (US)

( * ) Notice: Subject to any disclaimer, the term of this patent is extended or adjusted under 35 U.S.C. 154(b) by 0 days.

(21) Appl. No.: 12/944,065

(22) Filed: Nov. 11, 2010

(65) Prior Publication Data

US 2011/0057349 A1 Mar. 10, 2011

Related U.S. Application Data

(62) Division of application No. 12/196,499, filed on Aug. 22, 2008.

(60) Provisional application No. 61/090,744, filed on Aug. 21, 2008, provisional application No. 61/090,864, filed on Aug. 21, 2008, provisional application No. 60/957,705, filed on Aug. 23, 2007.

(51) Int. Cl.
*C08K 5/526* (2006.01)

(52) U.S. Cl. ........ 524/147; 524/126; 524/128; 524/133; 524/151; 524/152; 524/153

(58) Field of Classification Search .................. 524/126, 524/128, 133, 147, 151, 152, 153
See application file for complete search history.

(56) References Cited

U.S. PATENT DOCUMENTS

| | | |
|---|---|---|
| 2004/0013833 A1 | 1/2004 | Lee et al. |
| 2007/0082157 A1 * | 4/2007 | Heater et al. ................ 428/35.7 |
| 2007/0088133 A1 * | 4/2007 | Heater .......................... 525/418 |
| 2007/0093615 A1 * | 4/2007 | Callander et al. ............. 525/425 |
| 2008/0076841 A1 | 3/2008 | Bourgeois et al. |
| 2009/0054567 A1 * | 2/2009 | Heater .......................... 524/131 |
| 2009/0054601 A1 * | 2/2009 | Elliott et al. .................. 525/420 |

FOREIGN PATENT DOCUMENTS

| | | |
|---|---|---|
| EP | 0940443 A1 | 9/1999 |
| WO | 2007042230 A1 | 4/2007 |

OTHER PUBLICATIONS

Peter A. Szekely, USPTO "Office Action for U.S. Appl. No. 12/196,499", Jan. 19, 2010.
Edwin A. Sisson, "Response to Office Action for U.S. Appl. No. 12/196,499, Issued Jan. 19, 2010", Apr. 4, 2010.
Peter A. Szekely, USPTO "Office Action for U.S. Appl. No. 12/196,499", May 21, 2010.
Edwin A. Sisson, "Response to Office Action for U.S. Appl. No. 12/196,499, Issued May 21, 2010", Aug. 13, 2010.
Peter A. Szekely, USPTO "Office Action for U.S. Appl. No. 12/196,499", Aug. 24, 2010.

* cited by examiner

*Primary Examiner* — Peter Szekely
(74) *Attorney, Agent, or Firm* — Edwin A. Sisson, Attorney at Law, LLC

(57) ABSTRACT

The use of oxidizable phosphorus or phosphorous stabilizers, such as the phosphites, to reduce the color formation of the ionomeric polyester compositions is disclosed.

14 Claims, No Drawings

PHOSPHITE STABILIZERS FOR IONOMERIC POLYESTER COMPOUNDS

PRIORITY AND CROSS REFERENCES

This patent application is a divisional patent application of U.S. Patent Non-Provisional patent application Ser. No. 12/196,499, filed on 22 Aug. 2008, claiming the benefit of the priority of U.S. Provisional Patent Application 60/957,705, filed on 23 Aug. 2007, U.S. Provisional Patent Application 61/090,744, filed on 21 Aug. 2008, and U.S. Provisional Patent Application 61/090,864 filed on 21 Aug. 2008, the teachings of which are incorporated in their entirety. This application claims the benefit of priority of the 4 applications.

BACKGROUND

It is known in the industry to disperse a polyamide polymer into a polyester polymer matrix. It is also known that sulfonated polyester polymers will increase the dispersion. It is also known that color bodies may form during the dispersion process and that the use of the lithium salt of the sulfonated polyester polymer reduces the color formation.

These dispersions are used in the packaging industry to create high barrier bottles. What has been observed is that when the bottles are ground up and the dispersion is exposed to a second thermal history, such as drying and re-extrusion, there can be an increase in yellow color.

While some advocate the use of phosphates, one would not typically use the phosphites, or oxidizable phosphorus compounds. It is well known that the use of oxidizable phosphorus compounds reduces the catalyst such as antimony to its elemental metal form in the polyester causing an undesirable dark color.

There exists therefore a need for a stabilizer that does not reduce the metal catalyst in the polyester polymer and that has a minimal or reduced increase in yellow color upon the second thermal history; such as would occur during the recycling operation.

SUMMARY

This specification discloses a composition comprising an oxidizable phosphorus compound and an ionomeric polyester derived from at least one ionomeric monomer wherein at least 90% of the acid units of the ionomeric polyester are derived from the group consisting of terephthalic acid, isophthalic acid, orthophthalic acid, 2,6 dimethylnaphthalic acid, and their respective dimethyl esters and the composition has a total amount of polyester which is the amount of ionomeric polyester polymer plus the amount of non-ionomeric polyester polymer, if present.

It is further disclosed that the ionomeric monomer of the composition may be selected from the group consisting of the metal salt of a sulfonate of terephthalic acid, isophthalic acid, orthophthalic acid, 2,6 dimethylnaphthalic acid, and their respective dimethyl esters.

It is also disclosed that the oxidizable phosphorus compound can be selected from the group consisting of triphenylphosphite, trimethylphosphite, triethylphosphite, (2,4,6-tri-t-butylphenol)2-butyl 2 ethyl 1,3-propanediol phosphite, bis (2,4-di-tert-butylphenyl) Pentaerythritol diphosphite and tetrakis(2,4-di-tert-butylphenyl) 4,4-biphenyldiphosphonite.

The oxidizable phosphorus compound is present in the ranges of 15 to 150 parts phosphorus to million parts total polyester polymer, 15 to 120 parts phosphorus to million parts total polyester polymer, or 30 to 100 parts phosphorus to million parts total polyester polymer.

It is also disclosed that composition be essentially void of a polyamide polymer. It is also disclosed that the may further comprises a polyamide polymer in the range of 0.2 percent by weight of the composition to 10 percent by weight of the composition.

The composition can also be essentially void of an elemental metal which was a metal ion reduced by the oxidizable phosphorus compound. Essentially void means that there is virtually no (<0.5 ppm) precipitated metal which has been precipitated by the addition of the phosphite. There could be metal present which has been precipitated by another compound. The comparison would be made between the composition with and without the phosphorus compound. To be essentially void of phosphorus precipitated metal, the composition with the oxidizable phosphorus compound would contain <0.5 ppm, and more preferably <0.25 ppm, of the elemental or precipitated metal as compared to a composition without the oxidizable phosphorus compound.

It also disclosed that the composition may have some elemental metal but less than 1 ppm of an elemental metal, or 2 ppm of an elemental metal, or 5 ppm elemental metal, or even less than 10 ppm of an elemental metal.

This process also discloses a process for thermally treating the preceding compositions comprising the step of heating any one of the compositions to a temperature above 70° C. for more than 2 minutes in the presence of oxygen.

DESCRIPTION

Non-oxidizable phosphorus ($P^{+5}$) compounds are often used to stabilize polyester polymers. Phosphoric acid ($H_3PO_4$) is a commonly used stabilizer. Oxidizable phosphorus compounds ($P^{+3}$), such triethylphosphite (TEP) are virtually never used to stabilize polyesters because of the oxidation-reduction reaction of the oxidizable phosphorus compound with the reducible (oxidized) metal ion catalyst usually present in the polymer. As the phosphorus compound is oxidized, the metal is reduced, often creating an elemental metal particle that plugs filters, builds up on the reactor walls, and creates a dark color in the finished article. While the above effects have been observed in the non-ionomeric polyethylene terephthalate and polyethylene terephthalate copolymers, there is little or no information regarding the use oxidizable phosphorus compounds in ionomeric polyester polymers, e.g. polyethylene terephthalate copolymers containing an amount of sulfonated metal salts, such those derived from sodium or lithium sulfo-isophthalic acid.

What has been discovered is that the oxidation-reduction reaction of the oxidizable phosphorus compound with the metal catalyst does not occur to any great extent when the polymer is ionomeric. Thus, a larger amount of stabilizer can be used in the composition when compared with the composition without the ionomer without affecting the darkness of the resulting polymer.

It has also been discovered that the oxidizable phosphorus stabilizer is effective at reducing the color shift caused by subjecting the combination of the ionomeric polymer and a polyamide to a heat history such as drying or melting and extruding.

Thus, this invention is directed primarily to a composition comprising an ionomeric polyester polymer and an oxidizable phosphorus stabilizer and the composition does not contain a polyamide. By "does not contain a polyamide" it means that the composition could be void of a polyamide polymer, essentially void of a polyamide polymer, or contains essentially no polyamide.

However, there are alternative compositions which would include a polyamide, therefore, the invention is also directed to a composition comprising an ionomeric polyester polymer and an oxidizable phosphorus stabilizer and the composition further comprises a polyamide polymer.

The invention is also to a process for heating a composition comprising an ionomeric polymer and a polyamide, where the process comprises the step or steps of creating a composition comprising an ionomeric polyester polymer, a polyamide polymer and an oxidizable phosphorus compound, subjecting the composition to a thermal treatment of at least 70° C. for at least 2 minutes in the presence of oxygen, such as drying in air. This thermal treatment includes but is not limited to drying, extruding, and/or solid phase polymerizing the composition.

The ionomeric polymers suitable for this invention include those polyesters which are made using the polar co-monomers.

One suitable type of ionomeric polymers are the crystallizable sulfonated polyester polymers. The term crystallizable means that the thermoplastic polymer can be become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

A crystallizable polymer will form crystals when the polymer is gradually cooled from the molten state. These crystals will generate diffraction observable by X-ray.

Preferably, the thermoplastic polymers used in the present invention comprise a sulfonated polyester polymer which means a sulfonated homopolymer of polyethylene terephthalate or sulfonated crystallizable copolymer of polyethylene terephthalate. For clarity, the terms crystallizable polyethylene terephthalate and group consisting of crystallizable polyethylene terephthalates, refers to polymers which are crystallizable and comprised of at least 85% polyethylene terephthalate repeating segments. The remaining 15% may be any other combination of acid-glycol repeating units, provided that the resulting polymer is capable of achieving a degree of crystallinity of at least 5%, more preferably 10%.

The term crystallizable polyester refers to polymer which is crystallizable and at least 85% of its acid moieties are selected from the group consisting of terephthalic acid, 2,6-naphthalene dicarboxylic acid or their respective di-methyl esters.

The useful polyester polymers are the phthalate and naphthalate polymers which means that acid moieties are derived from terephthalic acid, orthophthalic acid, isophthalic acid, 2,6-naphthalate dicarboxylic acid, or their respective dimethyl esters.

Regardless of the primary acid choice, at least some of the polyester polymer in the polyester phase is to be sulfonated.

One preferred crystallizable polyester is PET, which is the group of polyesters consisting of polyethylene terephthalate and copolymers of polyethylene terephthalate including copolymers of polyethylene terephthalate modified with metal salt of sulfoisophthalate derived from the di-ester or di-carboxylic acid of sulfoisophthalate (SIPA) in the approximately 1:1 stoichiometric reaction of the acids, or their di-esters, with ethylene glycol.

Specific copolymers of interest are the crystallizable polyethylene terephthalates which have at least one sulfoisophthalate as an acid moiety and at least one other acid moiety derived from the comonomers selected from the group consisting of isophthalic acid or its diester, 2,6-naphthalene dicarboxylic acid or its diester, and cyclohexane dimethanol. The preferred sulfoisophthalate is lithium sulfoisophthalate with the levels of lithium sulfoisophthalate within the range of 0.01 and 2.0 mole percent based upon the acid moieties of the polyesters in the article.

Another preferred crystallizable polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. In addition to the metal sulfonate such as the metal salt of sulfoisophthalic acid, other aromatic and aliphatic acids which may be used simultaneously to make a copolymer include, for example, isophthalic acid and sebacic acid.

Another preferred crystallizable polyester is polyethylene naphthalate, also known as PEN. It is made by the reaction of 2,6-naphthalene dicarboxylic acid or its diester (2,6-dimethyl naphthalate) with ethylene glycol.

It is also contemplated that the crystallizable polyester of the present invention may comprise recycled polyester or materials derived from post consumer or post industrial recycled polyester, such as polyester monomers, catalysts, and oligomers.

The polyester polymer could also be a mixture of unsulfonated polyester molecules and sulfonated polyester molecules.

The polyester polymer molecules in the polyester polymer phase usually contain at least one metal sulfonate. While the sulfonated polyester polymer affects the interfacial tension between the polyamide polymer when the two are mixed, the presence of the polyamide is not essential for the operation of the oxidizable phosphorus compound to stabilize the polyester without reducing the metal.

The preferred polymer composition is therefore an ionomeric polyester polymer where the ionomeric polyester polymer is a sulfonated polyester, preferably lithium sulfoisophthalic acid in the range of 0.01 mole % to 5 mole %, and triethylphosphite (TEP) in the amount of 5 to 200 ppm as elemental phosphorus in the TEP to sulfonated polyester.

The sulfonated polyester polymer will usually comprise metal sulfonate derived from a functionalized metal sulfonate. The term functionalized metal sulfonate to describe a compound of the form R—$SO_3$M, where M is the metal ion and R is an aliphatic, aromatic, or cyclic compound with at least one functional group that allows the functionalized metal salt to react with the polyester or its respective monomers or oligomers where M designates the metal ion. Functionalized metal sulfonates included in this invention are the lithium and sodium salts of sulfonated comonomers, including aliphatic and aromatic alcohols, carboxylic acids, diols, dicarboxylic acids, and multifunctional alcohols, carboxylic acids, amines and diamines. In contrast, non-functional metal sulfonates are those of the R—SO₃M, and R does not have functional group. The phrase metal sulfonate therefore refers to both functional and non-functional metal sulfonates. An example of this sulfonated polystyrene or polyolefins which are known to act as metal sulfonates in the polyester-polyamide systems.

In general, the metal sulfonate exists in functionalized form of the form X—R, where X is an alcohol, carboxylic acid or epoxy, most preferably a dicarboxylic acid or diol and R is R is —SO₃M, —COOM, —OM, —PO₃(M)₂, with M being a metal in a +1 or +2 valence state which can be selected from the group consisting of Li, Na, Zn, Sn, K and Ca and X—R is copolymerized into the polyester polymer to modify the interfacial tension. The amount of X—R needed will exceed 0.01 mole percent with respect to the total number of respective dicarboxylic acid or diol moles in the polymer composition. It is possible for X—R to include both a diol or dicarboxylic acid. In that case, the mole percent is based upon the total number of moles of respective diols, dicarboxylic acids, or polymer repeating units.

The functionalized metal sulfonate may contain 2 or more R groups. R is combined directly to the aromatic ring of X, which could be a diol, a dicarboxylic acid, or a side chain such as a methylene group. The following structure is an example,

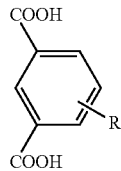

Where R is —SO₃M, —COOM, —OM, —PO₃(M)₂ with M designating a metal in a +1 or +2 valence state which can be selected from the group consisting of Li, Na, Zn, Sn, Ca and K. When R is —SO₃M, the compound is known as sulfonate, an organic sulfonate, or more specifically, sulfoisophthalic acid. If this entity is the metal sulfonate, then the polyester would contain acid units derived from a metal salt of sulfoisophthalic acid, wherein the metal can be selected from the group consisting of lithium, sodium, zinc, tin, calcium and potassium.

The dicarboxylic acids represented by X may be each ortha, meta, or para. They comprise for instance aromatic dicarboxylic acids such as terephthalic acid, isophthalic acid, orthophthalic acid, naphthalene dicarboxylic acid, diphenylether dicarboxylic acid, diphenyl-4,4-dicarboxylic acid etc.

X may also be aliphatic. In that event, aliphatic dicarboxylic acids such as oxalic acid, malonic acid succinic acid, glutaric acid, adipic acid, pimelic acid, suberic acid, azelaic acid, sebacic acid, etc. are suitable. Cycloaliphatic dicarboxylic acids such as cyclohexanedicarboxylic acid and one or more species of these can be used. Also included is isethionic acid. Specifically contemplated are mixtures of the dicarboxylic acids as well.

X can also represent an alcohol, preferably a diol of the structure:

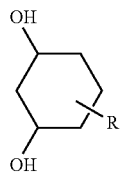

Where R is —SO₃M, —COOM, —OM, —PO₃(M)₂ where M is a metal in a +1 or +2 valence state which can be selected from the group consisting of Li, Na, Zn, Sn, K, and Ca.

The diols represented by X may also be aliphatic glycols such as ethylene glycol, 1,3 propanediol, 1,4-butanediol, 1,5-pentanediol, 1,6-hexanediol, 1,9-nonanediol, diethylene glycol, trimethylene glycol and cycloaliphatic diols such as cyclohexane diol, cyclohexanedimethanol and one or more species in combination can be used. Among these, ethylene glycol, diethylene glycol and cyclohexanediol are preferred.

Other functionalized metal sulfonates which can be used include hydroxyl terminated polyethers, such as polyethylene glycol (Carbowax) and cyclic amides such as ethoxylated dimethyl hydantoin. In addition, polyesters can be reacted with epoxy terminated compounds, including epoxy terminated polyethers, to produce a polyether side chain attached to the polymer.

The following depicts Lithium sulfoisophthalic acid (LiSIPA) or the sulfonic acid lithium salt modified isophthalic acid.

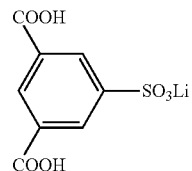

Of the salt forms, the di-carboxylic acid, di-ester, or prereacted low molecular weight oligomers such as the bis-hydroxyethyl ester of lithium sulfoisophthalate are preferred. It is also possible that the metal sulfonate, in this case the lithium sulfonate, occur in the diol form as well. Possible alternatives are ethylene glycol with the sulfonate group at the end of the pendant chain. It has even been proposed to place the sulfonate at the end of the polyester molecule. This can be accomplished by reacting or copolymerizing the polyester with the sulfonated salt of benzoic acid or other monofunctional species such as isethionic acid, either in the melt reactor or in an extruder.

In order to be reacted into, also known as copolymerized with, either polymer, the metal sulfonate must have at least one functional group. Examples of these functional groups are carboxylic acid (—COOH), alcohol (—OH), the ester of the carboxylic acid, epoxy termination, the diamine, or amine end groups.

The non-functionalized metal sulfonates are those compounds which contain the polar group, for example, the lithium salt, but do not have any functional end groups which allow the metal sulfonate to react with the polyester or polyamide. The lithium salt of sulfonated polystyrene is an example. In the three component system, the mole percent of the metal sulfonate is the mole percent based upon all the acid groups of the polyester.

As taught below, the polyester polymer is modified with the metal sulfonate. This modification is done by copolymerizing the metal sulfonate into the polymer chain.

The composition can comprise the elements in a two component form. In addition to the two components, other compounds may, of course, be present in the composition. In one embodiment of the two component form, a metal sulfonate is copolymerized with the polyester polymer to make the polyester a sulfonated polyester copolymer.

The elements of the composition can also be present as more than two components. Again, in addition to the critical components, other compounds may, of course, be present in the composition. For instance, one embodiment is a polyester without a metal sulfonate copolymerized with the polymer, a polyester with a metal sulfonate copolymerized with the polymer, and the polyamide without a metal sulfonate copolymerized with the polyamide and an oxidizable phosphorus compound. Another embodiment is a polyester without a metal sulfonate copolymerized with the polymer, a polyester with a metal sulfonate copolymerized with the polymer, and an oxidizable phosphorus compound.

Another embodiment is a polyester without a metal sulfonate copolymerized with the polymer, a polyester with a metal sulfonate copolymerized with the polymer, a polyamide with a metal sulfonate copolymerized with the polyamide and a polyamide without a metal sulfonate copolymerized with the polyamide and an oxidizable phosphorus compound.

For example, a typical homopolymer polyester has 100 mole percent terephthalate derived from terephthalic acid and almost 100 mole percent ethylene derived from ethylene glycol, with the remaining glycol being diethylene derived from diethylene glycol which is derived in situ during the manufacturing process. 100 moles of polymer with 5 mole percent of the ionic dicarboxylic acid co-monomer, such as lithium sulfoisophthalic acid would contain 95 moles of terephthalate derived from terephthalic acid, 5 moles of lithium sulfoisophthalate and approximately 100 moles of ethylene derived ethylene glycol. Similarly, it may be advantageous to use another comonomer such as isophthalic acid. For example, if one could substitute 2 moles of the terephthalate with 2 moles of isophthalate and create a polymer with 2 moles isophthalate, 93 moles terephthalate, 5 moles sulfoisophthalate and approximately 100 moles ethylene to make 100 moles of polymer repeat unit.

In the three component blend system, the moles of acid are the moles of acid in the sulfonated polyester polymer plus the moles of acid in the compatible unmodified polyester polymer. For example, if there were two polyesters present, one containing sulfoisophthalate, and the other did not, the mole percent of the sulfoisophthalate would be the moles of sulfoisophthalate divided by the moles of acid moieties of the two polyesters added together.

It is also well known that di-ethylene glycol is formed in-situ in the manufacture of polyester and about 1-3 percent of the total moles of glycol derived repeat unit will be diethylene derived from diethylene glycol. Therefore, the polyester compositions are often about 97 mole percent ethylene and about 3 mole percent di-ethylene.

Typical levels for a metal sulfoisophthalate derived from the metal sulfoisophthalic acid or its di-methyl ester are in the range of about 0.01 to about 15 mole percent, with the range of about 0.05 to about 10 mole percent being more preferred, with the range of about 0.1 to 5 mole percent also preferred, with the range of about 0.2 to about 4 mole percent and about 0.3 to about 2 mole percent also being good operational ranges. The amount of metal sulfonate is determined by measuring the amount of sulphur in the polymer or the metal in the polymer. For the case of the sulfonates belonging to the class of isophthalates, they can be described as being a metal sulfoisophthalate derived from the metal sulfoisophthalic acid or glycol, wherein the metal is selected from the group consisting of lithium, sodium, potassium, calcium, zinc, and manganese.

Polyesters modified with the metal sulfonate employed in the present invention can be prepared by most polymerization procedures. The traditional techniques can be divided into the ester, acid, and modified processes. In the ester process, the dimethyl ester of the carboxylic acid or acids is reacted with the glycol or glycols in the presence of heat and the methanol removed yielding the bis-hydroxyethyl ester of the acids. The bis-hydroxyethyl ester is then polymerized in its liquid form by subjecting the material to vacuum and heat to remove the glycols and increase the molecular weight. A typical process for the object polymer with a metal sulfonate would start with these ratios: 98 moles of dimethyl terephthalate, 2 moles of dimethyl sodium salt of sulfoisophthalate and 220 moles of glycol, typically ethylene glycol. Of the 220 moles of glycol, 120 are excess which are removed during processing. It should be noted that it is possible to obtain the sulfonated co-monomer in either its bis-(hydroxyethyl) or dimethyl ester form.

For clarification, the phrase copolymerized with at least X percent of a specific acid means that the compound is considered as part of the acid group of the polymer, such as terephthalic or isophthalic acid. It provides the reference to determine how many moles of the compound to use. The phrase does not mean that the compound must be added to the process as an acid. For example, lithium sulfoisophthalic acid could be copolymerized into polyethylene terephthalate as the acid with two carboxylic end groups, as the dimethyl ester of the carboxylic acid, as the bis-hydroxyethyl ester of the dimethyl ester, as very low molecular weight oligomers of a glycol acid polymer where the acid moieties are at least in part, the sulfoisophthalate salt, or as the di-alcohol.

The phrase "copolymerized salt of the acid" should not limit the claim to only using the acid form, but should be read to mean that the compound is one of the acid derived groups in the polymer.

The phrase "copolymerized with" means that the compound has been chemically reacted with the polymer, such as in the polymer chain or as a pendant group. For example, a polyester copolymerized with lithium sulfoisophthalate, or modified by copolymerizing at least 0.01 mole percent sulfoisophthalate into the polyester, means that sulfoisophthalate is bonded to the polymer, including bound into the polymer chain, with at least one chemical bond. The phrases are indifferent to how the material is incorporated into the polymer. A polyester copolymerized with lithium sulfoisophthalate, or modified by copolymerizing at least 0.01 mole percent lithium sulfoisophthalate into polyester refers to a polyester containing the lithium sulfoisophthalate whether that lithium sulfoisophthalate was incorporated using but not to limited to lithium sulfoisophthalic acid, lithium sulfobenzoic acid, the dimethyl ester of lithium sulfoisophthalic acid, the methyl ester of lithium sulfobenzoic acid, the lithium sulfohydroxy benzene, the lithium salt of hydroxy benzene sulfonic acid, or oligomers or polymers containing the lithium sulfoisophthalate.

While the preceding paragraph used lithium as an example, the same would be true for the sodium and other metal salts. It should be noted that the references to lithium in this specification should not limit the claims to just the lithium salt. While lithium is the preferred metal, there is no reason to believe that the use of the oxidizable phosphorus compound will not be effective with the other metals such as sodium, therefore the use of other metals is also contemplated.

The phrases "and derivatives" and "and its derivatives" refer to the various functionalized forms of the metal sulfonate salt which can be copolymerized into the polymer. For example, lithium sulfoisophthalate "and its derivatives" refers collectively and is not limited to lithium sulfoisophthalic acid, the dimethyl ester of lithium sulfoisophthalic acid, the bis-hydroxyethyl ester of lithium sulfoisophthalic acid, low molecular weight oligomers, and high I.V. polymers containing lithium sulfoisophthalate in the polymer chain.

The same nomenclature applies to the glycol or alcohol containing the metal sulfonate.

In the acid process, the starting materials are the di-carboxylic acids, with water being the primary by-product. The charge ratio in a typical acid process is 99.5 moles terephthalic acid, 0.5 moles of a metal salt of sulfoisophthalic acid (e.g. lithium sulfoisophthalic acid—LiSIPA), and 120 moles of glycols, typically ethylene glycol. The initial charge also includes the oxidizable phosphorus compound and catalyst. After reaction of the glycols with the acids, the material is subjected to the same polymerization process conditions as the ester process. In practice, many of the salts degrade and are therefore added in as a pre-reacted bis-hydroxy ester form.

The modified processes are variations of either process; combining the intermediary product at certain steps. For example, the acid process may be used with just terephthalic acid to produce its low molecular weight intermediate and the ester process used to produce the bis-hydroxyethyl ester of the homopolymer sulfonated polyester. These two intermediates are then combined and polymerized to a more random copolymer. Another variation is to add the finished modified polymer to the melt reactor and let the melt process depolymerise the modified polymer and then form a random copolymer. The three component system, of PET, sulfonated PET, and is considered a part of this invention.

If one wanted to make a terpolymer containing the unmodified isophthalic acid derivative, one would use 98 moles of terephthalic acid, 0.5 moles of lithium sulfoisophthalic acid, and 1.5 moles of unsulfonated isophthalic acid.

Another technique for manufacturing the modified polymer is to completely trans-esterify a modified polyester with a large amount of metal sulfonate moieties into a unmodified polyester to create a blockier copolymer. This can be done using other techniques such as a long residence time and/or high temperature extrusion.

Examples of the oxidizable phosphorus compounds are:

Sandostab® P-EPQ, (CAS 119345-01-6) also known as tetrakis(2,4-di-tert-butylphenyl) 4,4-biphenyldiphosphonite available from Clariant GmbH, Germany.

Triethylphosphite (CAS 122-52-1) $C_6H_{15}O_3P$, available from Sigma-Aldrich, St. Louis, Mo. 63103 USA.

Trimethylphosphite (CAS 121-45-9) $C_6H_{15}O_3P$, available from Sigma-Aldrich, St. Louis, Mo. 63103 USA.

Triphenylphosphite (CAS 101-02-0) $C_6H_{15}O_3P$, available from Sigma-Aldrich, St. Louis, Mo. 63103 USA.

Ultranox 626® (CAS 26741-53-7) known as bis (2,4-di-tert-butylphenyl) Pentaerythritol diphosphite available from Crompton Corporation, now Chemtura Corporation, Middlebury Conn., USA.

Ultranox 641® (CAS 161717-32-4) known as (2,4,6-tri-t-butylphenyl)2-butyl 2 ethyl 1,3-propanediol phosphite available from Crompton Corporation, now Chemtura Corporation, Middlebury Conn., USA (MW=450).

While there is no true upper limit to the amount of stabilizer, the stabilizer should be present in amount sufficient so that phosphorus is present in the range of 15 parts phosphorus per million parts of the total amount of polyester polymer in the composition to 150 parts phosphorus per million parts of the total amount of polyester polymer in the composition. The total amount of polyester polymer in the composition is the amount of ionomeric polyester polymers present plus the amount of non-ionomeric polyester polymers, if present. While the 15 to 150 ppm on the basis of elemental phosphorus is desirable, 15 to 120 ppm on the basis of elemental phosphorus is more desirable with 20 to 100 ppm on the basis of elemental phosphorus being the most desired.

Addition of the oxdizable phosphorus compound is preferably done by melt mixing the oxidizable phosphorus compound with the ionomeric polyester polymer at the beginning of the reaction.

The stabilizer can also be added via subsequent melt mixing when the ionomeric polyester polymer melted and optionally extruded into a part or blended with a non-ionomeric polyester polymer, or optionally the polyamide.

Since the oxidizable phorphorous compound stabilizes the ionomeric polyester without reducing the antimony, this composition has utility even without the presence of polyamide. Therefore the composition may be void of a polyamide polymer, essentially void of a polyamide polymer, consist of the ionomeric polymer and the oxidizable phosphorus compound, or consist essentially of the ionomeric polymer and the oxidizable phosphorus compound.

Since the invention also stabilizes in the presence of polyamide, the composition may further comprise a polyamide polymer. The polyamides which could be modified or unmodified that are suitable for this invention can be described as those selected from the group consisting of the repeating unit of amino caproic acid or A-D, wherein A is the residue of a dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof.

These polyamides can range in number average molecular weight from 2000 to 60,000 as measured by end-group titration. These polyamides can also be described as the reaction product of amino caproic acid with itself and/or the reaction product of a residue of dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof with a residue of a diamine comprising m-xylylene diamine, p-xylylene diamine, hexamethylene diamine, ethylene diamine, or 1,4 cyclohexanedimethylamine, or a mixture thereof.

Those skilled in the art will recognize many of the combinations as well known commercially available polyamides. The reaction product of the residue of sebacic acid with hexamethylene diamine is nylon 6, 10 and the reaction product of the residue of adipic acid and hexamethylene diamine is nylon 6, 6. Nylon 6, 12 is another nylon which benefits from the invention. Nylon 6 is a special type of polyamide which is made by the opening of caprolactam and then polymerizing the resulting amino caproic acid which has a formula of $H_2N—(CH_2)_5—COOH$. One useful polyamide is the reaction product of the residues of adipic acid and m-xylylene diamine, known as poly-m-xylylene adipamide. This product is commercially known as MXD6 or nylon MXD6 and can be purchased from Mitsubishi Gas Chemical Company, Japan.

The preferred amount of polyamide is between 1 and 15 parts per 100 parts of the composition of the article, preferably between 3 and 8 parts per 100 parts of the composition of the article, with the most utility occurring between 4 and 7 parts of polyamide per 100 parts of the composition of the article. The amount of total polyester polymers should be at least 80% of the total weight of the article, with the weight percent of all components of the composition adding to 100%.

EXPERIMENTAL

The following examples demonstrate the functionality of the invention:

Example 1

Crystallizable polyesters containing amounts lithium sulfonate in the form of lithium sulfo-isophthalate derived from lithium sulfoisophthalic acid (LiSIPA) were manufactured by placing 7692 gms of terephthalic acid, 194 gms of isophthalic acid, and 2924 gms of ethylene glycol into a vessel of pre-reacted oligomers from the previous batch. The pre-reacted oligomers are called a heel. The weight of heel to batch, amount charged to reactor, is approximately 1:1. The contents were held under 3.38 bar pressure at 262° C. After 35 minutes, 4.5 gms of 1% lithium by weight mixture of lithium acetate in ethylene glycol, up to 90.7 gms of 1% phosphorous (60 ppm phosphorous) by weight mixture of triethyl phosphate (TEP) diluted in ethylene glycol, 0.0550 gms SB138 toner and 0.02908 SV50 toner were charged to the reactor. The contents were held in this vessel under agitation for 3 hours with an oil temperature of 271° C., with the content temperature increasing from 248° C. to 263° C., at 3.38 bar. Water was removed from the vessel during this time.

After reacting for 3 hours, a portion of the vessel contents were transferred to a second vessel. The heel remaining in the first vessel was approximately the same amount as was in the vessel when the raw materials were first charged. Once in the second vessel, 223 of 1% antimony by weight, 191 gms of a 5% bis-hydroxyethyl ester of lithium sulfoisophthalic acid—95% ethylene glycol solution and 1412 gms of ethylene glycol were added to the material transferred from the first vessel to the second vessel. The contents of the second vessel were agitated at atmospheric pressure and 244° C. After 30 minutes of mixing, the pressure was reduced to 100 torr, and after another 26 minutes, the pressure reduced to 1.0 torr. 40 minutes later the pressure was 0.2 torr and maintained at that pressure for 20 minutes before discharging the ingredients and pelletizing the material in its amorphous form.

This amorphous pelletized material was combined with several other similarly produced batches and then solid phase polymerized in a batch rotating vacuum vessel at 0.1 mmHg and 230° C. until a 0.802 I.V. (dl/gm) was reached. The amount of lithium sulfoisophthalate was varied for the resulting mole percentages. The amount of lithium sulfoisophthalate reported in the tables is based upon measuring the amount sulfur in the polymer using X-RAY and not upon the amount charged.

Hunter L* color was measured on the resin using a HunterLab ColorQuest XE. Results are reported in Table 1.

Example 2

Crystallizable polyester resin was produced essentially as described in Example 1 except without the addition of LiSIPA and with adjustments to the toner levels to yield about the same polymer color as made in Example 1. Resin was batch SSP as described in Example 1 and color data was measured. Hunter L* color was measured on the resin using a HunterLab ColorQuest XE. Results are reported in Table 1.

Controls were also produced following the procedures of Examples 1 and 2 without the addition of TEP, designated as 1a and 2a in Table 1 below. The small change in L* color when Li(SIPA) is added indicates no precipitated antimony.

TABLE 1

Effect of TEP on L* Color of PET Modified with Li(SIPA)

| Example | Phosphorous Compound | Phosphorous Content (ppm) | LiSIPA (ppm) | L* Color | Change in L*Color Compared to control |
|---|---|---|---|---|---|
| 1a | TEP | 0 | 50 | 76.5 | — |
| 1b | TEP | 60 | 50 | 74.7 | 1.8 |
| 2a | TEP | 0 | 0 | 62.4 | — |
| 2b | TEP | 60 | 0 | 48.1 | 14.3 |

Example 3

Crystallizable polyester resin was produced as described in Example 1. The resin was batch solid state polymerized as described in Example 1. Approximately, 100 grams of polyamide pellets with the end group and molecular weights provided in Example 1 were dried separately and melt blended with 1900 grams of a crystallizable polyester described in Example 1. Preforms were then produced and ground and air dried at 177° C. for 6 hours in SSP batch scale reactors to simulate a recycle process. The Hunter b* color was measured on the ground performs. Preform colors were measured using a HunterLab ColorQuest XE. The results are reported in Table 2.

Example 4

Crystallizable polyester resin was produced as described in Example 3, however no TEP was added as a stabilizer. Preforms were produced and ground as described in Example 3. The Hunter b* color was measured on the ground performs. Preform colors were measured using a HunterLab ColorQuest XE. The results are reported in Table 2.

TABLE 2

The Benefit of the Effect of TEP on b* Color of PET Resin Modified with LiSIPA and Polyamide

| Example | Phosphorous Compound | Phosphorous Content (ppm) | Li(SIPA) (ppm) | Polyamide Content (wt %) | b* Color |
|---|---|---|---|---|---|
| 3 | TEP | 58 | 60 | 5 | 21.7 |
| 4 | TEP | 0 | 50 | 5 | 33.3 |

TEST METHODS

HunterLab ColorQuest Test Method

The HunterLab ColorQuest XE Spectrocolorimeter Test Method was used to measure L*, a* and b* colors on the resin. Following the instruction manual, and using the appropriate specimen holder each sample is tested in four different places. Upon completion of the test, the software is capable of displaying, saving, and printing an average and standard deviation for the requested customer defined scales and parameters.

The invention claimed is:

1. A process for thermally treating an article, which is a preform, wherein the process comprises grinding the preform and heating the ground preform to a temperature above 70° C. for more than 2 minutes in the presence of oxygen, wherein the article comprises an oxidizable phosphorus compound and an ionomeric polyester derived from at least one ionomeric monomer, wherein at least 90% of the acid units of the ionomeric polyester are derived from the group consisting of terephthalic acid, isophthalic acid, orthophthalic acid, 2,6 naphthalene dicarboxylic acid and their respective dimethyl esters, wherein the composition has a total amount of polyester which is the amount of ionomeric polyester plus the amount of non-ionomeric polyester, if present, and the ionomeric polyester has been catalyzed with an antimony compound, wherein elemental antimony reduced by the oxidizable phosphorus compound is less than 5 ppm of the total amount of polyester.

2. The process of claim 1 wherein the ionomeric monomer is selected from the group consisting of the metal salt of a sulfonate of terephthalic acid, isophthalic acid, orthophthalic acid, 2,6 dimethylnaphthalic acid, and their respective dimethyl esters.

3. The process of claim 1, wherein the oxidizable phosphorus compound is selected from the group consisting of triphenylphosphite, trimethylphosphite, triethylphosphite, (2,4,6-tri-t-butylphenol)2-butyl 2 ethyl 1,3-propanediol phosphite, bis (2,4-di-tert-butylphenyl) Pentaerythritol diphosphite and tetrakis(2,4-di-tert-butylphenyl) 4,4-biphenyldiphosphonite.

4. The process of claim 2, wherein the oxidizable phosphorus compound is selected from the group consisting of triphenylphosphite, trimethylphosphite, triethylphosphite, (2,4,6-tri-t-butylphenol)2-butyl 2 ethyl 1,3-propanediol phosphite, bis (2,4-di-tert-butylphenyl) Pentaerythritol diphosphite and tetrakis(2,4-di-tert-butylphenyl) 4,4-biphenyldiphosphonite.

5. The process of claim 1, wherein the oxidizable phosphorus compound is present in the range of 15 to 150 parts phosphorus to million parts total polyester polymer.

6. The process of claim 2, wherein the oxidizable phosphorus compound is present in the range of 15 to 150 parts phosphorus to million parts total polyester polymer.

7. The process of claim 3, wherein the oxidizable phosphorus compound is present in the range of 15 to 150 parts phosphorus to million parts total polyester polymer.

8. The process of claim 1, wherein the oxidizable phosphorus compound is present in the range of 30 to 100 parts phosphorus to million parts total polyester polymer.

9. The process of claim 2, wherein the oxidizable phosphorus compound is present in the range of 30 to 100 parts phosphorus to million parts total polyester polymer.

10. The process of claim 3, wherein the oxidizable phosphorus compound is present in the range of 30 to 100 parts phosphorus to million parts total polyester polymer.

11. The process of claim 1 wherein the article is essentially void of elemental antimony reduced by the oxidizable phosphorus compound.

12. The process of claim 2 wherein the article is essentially void of elemental antimony reduced by the oxidizable phosphorus compound.

13. The process of claim 3 wherein the article is essentially void of elemental antimony reduced by the oxidizable phosphorus compound.

14. The process of claim 7, wherein the article is essentially void of elemental antimony reduced by the oxidizable phosphorus compound.

* * * * *